Sept. 20, 1932.   F. WEMPE   1,878,217
APPARATUS FOR REGULATING THE OPERATION OF STEAM
GENERATING PLANTS, ESPECIALLY FOR LOCOMOTIVES
Filed Sept. 24, 1926   2 Sheets-Sheet 1
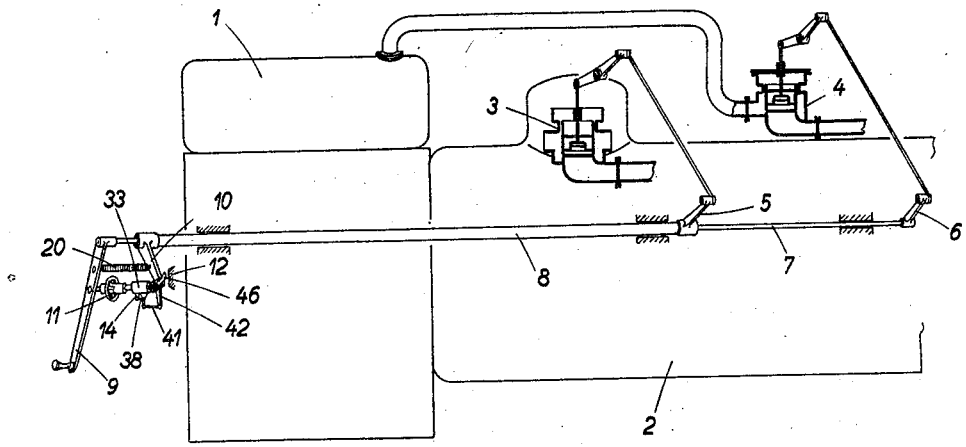
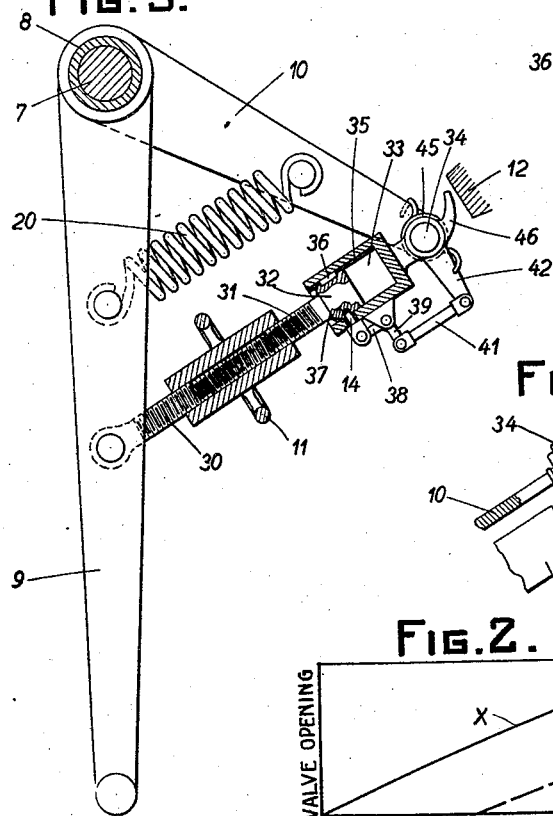
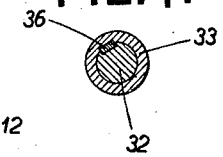
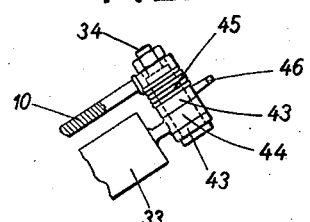
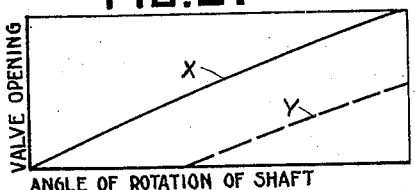
INVENTOR
Friedrich Wempe
BY
ATTORNEY Sept. 20, 1932.    F. WEMPE    1,878,217
APPARATUS FOR REGULATING THE OPERATION OF STEAM
GENERATING PLANTS, ESPECIALLY FOR LOCOMOTIVES
Filed Sept. 24, 1926    2 Sheets-Sheet 2
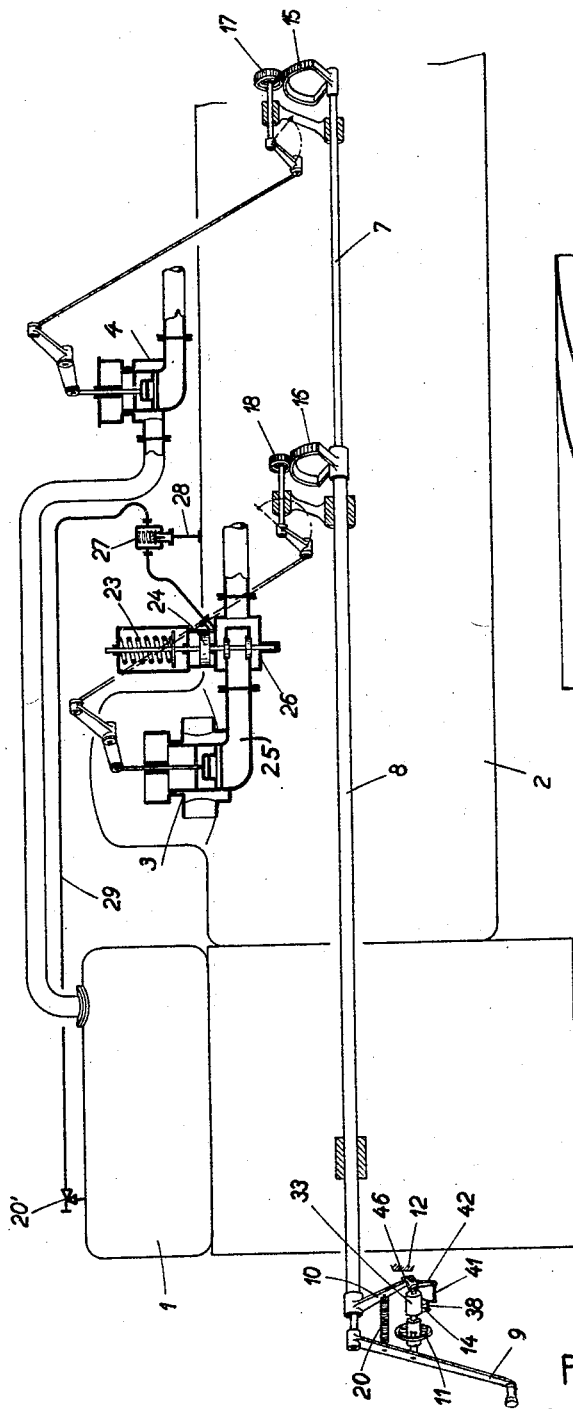
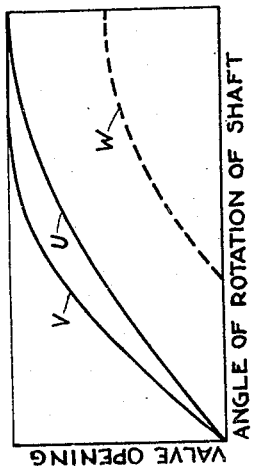
INVENTOR
Friedrich Wempe
BY
ATTORNEY Patented Sept. 20, 1932

1,878,217

UNITED STATES PATENT OFFICE

FRIEDRICH WEMPE, OF CASSEL-WILHELMSHOHE, GERMANY, ASSIGNOR TO SCHMIDT'-SCHE HEISSDAMPF GESELLSCHAFT M. B. H., OF CASSEL-WILHELMSHOHE, GERMANY, A CORPORATION OF GERMANY

APPARATUS FOR REGULATING THE OPERATION OF STEAM GENERATING PLANTS, ESPECIALLY FOR LOCOMOTIVES

Application filed September 24, 1926, Serial No. 137,423, and in Germany October 3, 1925.

The invention relates to apparatus for regulating the operation of steam-generating plants, especially for locomotives, and particularly of the type described in the pending application for Letters Patent filed in the United States Patent Office on March 16, 1925, Serial No. 16075 (issued as Patent No. 1,712,497, dated May 14, 1929), in which the regulators of the two or more steam generators operating at different pressures are actuated by means of a common adjusting device.

In said application various constructional forms are described, in one of which a regulator shaft is adjusted manually by a lever and in another, besides the manual adjustment, an automatic device is provided for adjusting the regulators in response to changes of steam pressure.

The present invention relates to a further development of the regulating apparatus of said earlier application, first as regards improvements in the manual adjustment, and second the supplementing of such hand adjustment by an automatic regulation responsive to the steam pressure.

In the application referred to above, the purely mechanical regulation by hand is effected by means of a regulator shaft which carries two cams, the shape and relative position of which determine the movement of the regulator valves.

The main object of the present invention is to secure the same result of a relatively-variable adjustment of the high-pressure and of the low-pressure regulators, without the use of such cams and their corresponding forked levers and in this way both to simplify production and also to render it possible during motion of the locomotive, relatively to adjust the position of the links transmitting the movement of the regulator shaft to the valve rods of the regulators.

With such an object, according to the present invention, I employ two regulator shafts located one within the other, one of said shafts carrying the hand lever disposed in the cab of the locomotive, and the other a regulating lever connected to the hand lever by means of an adjusting arrangement which can be locked or unlocked as required, while in addition the transmission of the adjusting movement to the regulator valves is effected, not by cams the relative position of which can not be changed, but by simple levers of which one, for example, that associated with the low-pressure boiler, is mounted on the outer one of said shafts.

According to another form of the invention, transmission from the inner shaft or the outer shaft is effected by means of toothed sectors instead of levers, these sectors and the pinions in mesh with them serving to transmit the adjusting movement to the regulator valves with different transmission ratios.

In the drawings:

Fig. 1 is a diagrammatic showing of one form of the invention.

Fig. 2 is a diagram of valve openings.

Fig. 3 is a detail view of the adjusting arrangement.

Fig. 4 is a cross section through the cylinder of Fig. 3.

Fig. 5 is a detail view of a part of Fig. 3.

Fig. 6 is a diagrammatic showing of a modified form of the invention.

Fig. 7 is a diagram of valve openings in the arrangement shown in Fig. 6.

In the drawings, the high-pressure boiler is denoted by the reference numeral 1, the low-pressure boiler by 2, the low-pressure regulator by 3, and the high-pressure regulator by 4; the inner regulator shaft, 7, carries at one end a lever, 6, from which by means of any suitable mechanism, the high-pressure regulator valve can be operated, and at the other end the hand lever, 9, disposed in the cab of the locomotive. On the inner shaft, 7, is rotatably mounted a hollow outer shaft, 8, which at one end carries the lever 5, for transmitting motion to the low-pressure regulator 3, and at the other end a second lever 10, which is connected with the hand lever 9, by an adjusting arrangement of the nature of a turnbuckle. This arrangement comprises a screw shaft 30 pivoted to the lever 9, a central internally threaded member 11 having a handwheel, and a second screw shaft 31. The shaft 31 carries a head or piston 32 which is slidably guided in a cylinder 33 pivoted by a bolt 34 to the lever 10. A groove 35 in the cylinder and a feather 36 on the piston 32 prevent rotary motion of the piston in the cylinder.

A locking pin 14 extends through one wall of the cylinder 33 and engages in a recess 37 in the piston 32, thus normally locking the piston non-slidably in the cylinder. Pivotally connected to the bolt 14 is one arm 38 of a bell crank lever mounted on the cylinder, the other arm 39 of the lever being pivoted to one end of a link 41. The other end of the link 41 is in turn pivoted to one arm 42 of a bifurcated lever having its furcations 43 rotatably mounted on the pivot bolt 34 on either side of the pivot portion 44 of the cylinder 33. Another arm 46 of this lever cooperates with a fixed abutment 12 for a purpose to be described. A coil spring 45 is wound around the bolt 34, with its ends engaging the lever 10 and 42 respectively, thus urging the lever 42 clockwise (Fig. 3). This spring thus constantly urges the pin 14 into locking position, that is, into the position shown in Fig. 3. A coil spring 20 is connected to the levers 9 and 10 and tends to draw them together or to decrease the angle between them.

Before the engineer starts the train, the arrangement is in the position shown in Fig. 3, both the regulators being closed. The lever 9 is now moved to the left, to open the high pressure regulator. Since the lever 10 is connected to the lever 9, it will also be moved and the low pressure regulator will be opened by an equal amount. The engine will therefore begin to operate, its speed depending on the amount of movement of the lever 9. The valves are opened by the amounts represented by the line $x$, Fig. 2.

Sometimes, particularly at high speeds, the supply of low pressure steam becomes too low. In such a case, it is desirable to partly close the low pressure regulator without affecting the position of the high pressure regulator. By turning the central member 11, the turnbuckle arrangement can be spread, and the lever 10 will be moved to the right, thus partly closing the low pressure regulator. When the turnbuckle is spread as wide as possible, the opening of the low pressure regulator is represented by the line $y$, Fig. 2. Further movement of the lever 9 still moves lever 10 by the same amount, and a constant difference between the openings of the two regulators is thus preserved.

When the engineer wishes to shut off steam to stop the engine, he merely moves the lever 9 to the right, in a direction to close the high pressure regulator. If the turnbuckle has been spread, lever 10 reaches its closed position before lever 9, thus closing the low pressure regulator while the high pressure regulator is still slightly open. As the lever 10 reaches closed position, the arm 46 strikes the fixed abutment 12. This moves the arm 42 counter-clockwise against the action of the spring 45 and moves the pin 14 out of the recess 37. There is now nothing to hold the piston in the outer end of the cylinder, and the spring 20 draws the lever 10 towards the lever 9 until the piston 32 strikes the bottom of the cylinder 33. This movement makes up for the spreading of the turnbuckle so that the angle between the levers is substantially the same as at the beginning of the operation, that is, before the regulators were opened.

As soon as the pin 14 is withdrawn and the cylinder moves until its bottom strikes the head of the piston, the arm 10 moves away from the abutment 12, thus releasing the pressure on the arm 46. The spring 45 will then push the pin 14 into its advanced position, but behind the piston 32.

While the spring 20, when the pin 14 is withdrawn, moves the lever 10 in a direction to open the regulator and to admit low pressure steam, such movement is only momentary as it is checked as soon as the piston reaches the bottom of the cylinder. Then the continued movement of the lever 9 moves the lever 10 on to closed position. This momentary admission of steam does not seriously affect the operation of the engine.

In order to restore the parts to their original position as shown in Fig. 3, after the regulators have been closed, the levers 9 and 10 may be held in closed position, manually or otherwise, and the pin 14 withdrawn by hand from its advanced position to which it has been moved by the spring 45. The turnbuckle is then drawn together so that the piston 32 moves towards the lever 9 and the outer end of the cylinder. When the recess 37 comes opposite the pin 14, the pin is released and the spring 45 pushes it into the recess. The parts are now locked in their original position, and the engineer can again move the lever 9 to admit steam.

The purpose of such an arrangement is obvious. Some sort of turnbuckle or the like must be provided if both levers are to be operated with one hand while permitting some relative variation of the amount of opening of the two regulators. In stopping, if it were necessary to screw back the turnbuckle, much valuable time would be lost, especially in an emergency. For this reason, the present arrangement is provided in which movement of one lever to closed position unlatches the locking device between the two levers and automatically restores both levers to their original closed position.

Fig. 2 shows the action of the valves. If the turnbuckle arrangement is not spread, both valves will open by equal or proportionate amounts, the degree of opening being represented by the ordinates of the curve $x$. If the levers are spread apart the maximum distance, the opening of the low pressure valve is proportionate to the ordinates of curve $y$, while the curve $x$ still represents the high pressure valve. With different degrees of spreading, the low pressure valve opening will obviously assume values intermediate the two curves.

In the form of the invention shown in Fig. 6, regulation is effected according to the same general principle. The mechanism employed, however, differs in the fact that in this case on the inner shaft, 7, and the outer shaft 8, respectively, toothed sectors, 15 and 16, are mounted, of which the sector 15, operates the high-pressure regulator by way of a pinion 17, with a lower transmission ratio than the tooth sector, 16, operates the low-pressure regulator, 3, by way of the smaller pinion, 18. When starting, the low-pressure regulator consequently is given a certain lead so that the low-pressure cylinder and the receiver already contain low-pressure steam when the steam from the high-pressure boiler is admitted to the high-pressure cylinder.

With the levers, 9 and 10, in their normal relative position the resulting valve-opening curves for the high-pressure and low-pressure valves will be as shown at $u$ and $v$ respectively in Fig. 7, while with the levers, 9 and 10, angled apart to the greatest possible extent the corresponding valve-opening curves for the high-pressure and low-pressure valves are shown at $u$ and $w$ respectively.

In a further development of the present invention corresponding to that form disclosed in the earlier application in which the regulator gear acts automatically in response to changes of steam pressure, instead of providing a steam-operated piston on the regulator shaft, I have interposed in the low-pressure steam pipe, an auxiliary regulator valve controlled by low-pressure steam, this auxiliary valve with a decrease in pressure in the low-pressure boiler reducing the quantity of steam withdrawn therefrom independently of the amount the low-pressure regulator has been opened by the regulator shaft.

In this form of the invention, in which the one regulator is automatically controlled by the steam pressure, the gearing is materially simplified, since the regulator shaft requires no motion except rotation by the hand lever and in particular is not to be given an axial movement by steam pressure.

The automatic regulating gear according to the present invention characterized by the provision of an auxiliary regulator in the low-pressure steam pipe, can be applied both to hand regulation by means of cams on the regulator shaft as described in the earlier application mentioned herein, and also by hand regulation by the devices described above with or without hollow shafts and adjusting devices including toothed sectors or with simple levers on the regulator shaft.

An arrangement of this character is shown diagrammatically in Fig. 6.

In this figure the high-pressure boiler 1, is formed as a fire-box while the low-pressure boiler of a two-pressure locomotive takes the form of the usual longitudinal boiler 2. The high-pressure regulator is indicated at 4, and the low-pressure regulator at 3, the low-pressure steam pipe being denoted by the numeral 25. In this pipe in accordance with the invention, an auxiliary regulator 26, is inserted, the valve spindle of which is provided with an actuating piston 24, below which steam from the low-pressure boiler can enter through the pipe, 28, by way of the non-return valve 27; in addition, the valve spindle is under the action of a helical spring 23, which tends to close the valve of the regulator. The two regulators, 3 and 4, are adjusted by means of the regulator mechanism above described in the cab of a locomotive. According to the particular example shown, simple levers are provided but cams with forked levers as in the earlier application or toothed sectors as in Fig. 4 of the accompanying drawings may be substituted.

The hollow shaft with its adjusting arrangements as shown in Figs. 1 and 4 may either be omitted or retained in a construction including the auxiliary regulator 26, as in Fig. 6. In the latter case, when ascending a grade the engineer by means of the shut-off valve, 20', described below can cut out the auxiliary regulator and by help of the adjusting device 11, can vary the proportion between the steam taken from the high-pressure and the low-pressure boilers. For such temporary cutting out of the auxiliary regulator, 26, a pipe, 29, is provided which leads from the high-pressure boiler 1, to the non-return valve, 27, the shut-off valve, 20', being inserted in this pipe in the cab of the locomotive.

The form of the invention just described operates as follows:—

If the shut-off valve, 20', is closed the space below the actuating piston, 24, of the auxiliary regulator, due to the connecting pipe 28, is at the pressure of the low-pressure boiler and counter-balances to a certain extent the action of the spring, 23. The higher the pressure in the low-pressure boiler the more is the spring, 23, compressed and the more is the valve of the auxiliary regulator 26, opened to pass low-pressure steam to the engine.

If, however, the pressure in the low-pressure boiler falls, the cross-sectional area available for flow of steam through the auxiliary regulator 26, diminishes in proportion and in consequence the low-pressure steam passing through the auxiliary regulator is throttled and the steam taken from the low-pressure boiler correspondingly reduced. The pressure in the low-pressure boiler will then rise and when such pressure exceeds a predetermined amount the increase in steam pressure will cause a corresponding further opening of the auxiliary regulator. There is thus a tendency when fluctuations of pressure occur in the low-pressure boiler, for the auxiliary regulator to maintain the pressure in such boiler at a definite figure.

In certain conditions of working, for example, when starting, it is desirable to have in the low-pressure cylinder all the steam pressure available even if the full working pressure in the low-pressure boiler has not yet been reached. In this case and also in the above-mentioned case of ascending a grade, the engineer opens the shut-off valve, 20', so that steam flows through the pipe 29, by way of the non-return valve, 27, from the high-pressure boiler to the space below the actuating piston, 24, of the auxiliary regulator. The valve of this regulator is consequently fully opened and remains in this position until the engineer again closes the shut-off valve, 20'. The high-pressure steam and also any condensate then leak through the piston rod guide of the auxiliary regulator to the low-pressure pipe so that the steam pressure below the piston correspondingly sinks and the valve of the auxiliary regulator, 26, assumes a position corresponding to the steam pressure in the low-pressure boiler.

Various changes in the specific form shown and described may be made within the scope of the claims without departing from the spirit of my invention.

I claim:

1. The combination with two steam generators of an apparatus for governing the action of regulators controlling the supply of steam from said steam generators, comprising two shafts, one located within the other, separate operative connections from the individual shafts to the respective regulators, a connection between said shafts to cause them normally to move in unison, a latching device for normally preserving said connection, and a stationary abutment cooperating with said latching device to render said connection inactive.

2. The combination with two steam generators of an apparatus for governing the action of regulators controlling the supply of steam from said steam generators, comprising two shafts, one located within the other, separate operative connections from the individual shafts to the respective regulators, a spring tending to turn said shafts one relatively to the other, a connection between said shafts to cause them normally to move in unison, a latching device for normally preserving said connection, and a stationary abutment cooperating with said latching device to release the latter, whereby relative rotation of said shafts in response to the action of said spring is permitted.

3. The combination with two steam generators of an apparatus for governing the action of regulators controlling the supply of steam from said steam generators, comprising two shafts, one located within the other, separate operative connections from the individual shafts to the respective regulators, a connection between said shafts to cause them normally to move in unison, said connection including an adjusting device for varying the position of one shaft angularly with relation to the other, a latching device for normally preserving said connection, and a stationary abutment cooperating with said latching device to render said connection inactive.

4. The combination with two steam generators of an apparatus for governing the action of regulators controlling the supply of steam from said steam generators, comprising two shafts, one located within the other, separate operative connections from the individual shafts to the respective regulators, a connection between said shafts to cause them normally to move in unison, said connection including an adjusting device for carrying the position of one shaft angularly with relation to the other, a spring tending to turn said shafts one relatively to the other, a latching device for normally preserving the connection between said shafts, and a stationary abutment cooperating with said latching device to release the latter whereby relative rotation of said shafts in response to the action of said spring is permitted.

5. The combination with two steam generating plants producing steam at different pressures and having individual regulators associated therewith, of an apparatus for controlling the supply of steam from said generating plant, said apparatus including two shafts one of which is within the other, a hand lever connected with one of said shafts, a regulating lever associated with the other shaft, an adjusting device connecting said levers whereby the angle between the latter may be varied and including locking means for holding the levers in their adjusted relative position, mechanism for automatically releasing said locking means and returning the levers to their original position on movement of the hand lever in a reverse direction, and operative connections from each of said shafts to the respective regulators.

6. A device as claimed in claim 5, in which the operative connections from the two shafts to the respective regulators include toothed sectors and pinions having one velocity ratio for one of said shafts and a different velocity ratio for the other shaft so that with the same angular movement of the sectors the adjustment of the two regulators will be different.

7. The combination with two steam generating plants producing steam at different pressures, of an apparatus for controlling the supply of steam from said generating plants, said apparatus comprising individual regulators associated with said steam generators, means connected to said regulators for operating the same, a steam pipe leading from the low-pressure regulator, an auxiliary regulator, controlled by low-pressure steam, interposed in the low-pressure steam pipe, said regulator, on the occurrence of a decrease of pressure in the low-pressure boiler, acting to reduce the amount of steam taken therefrom, a conduit connecting the auxiliary regulator to the generator of high pressure, and a valve in said conduit whereby said auxiliary regulator may be subjected by hand to the action of high-pressure steam from the high-pressure boiler and released therefrom as required.

8. The combination with two steam generators of an apparatus for governing the action of regulators controlling the supply of steam from said steam generators, comprising two shafts, separate operative connections from the individual shafts to the respective regulators a connection between said shafts to cause them normally to move in unison, a latching device for normally preserving said connection, and a stationary abutment cooperating with said latching device to render said connection inactive.

9. The combination with two steam generating plants producing steam at different pressures and having individual regulators associated therewith, of an apparatus for controlling the supply of steam from said generating plant, said apparatus including two shafts, a hand lever connected with one of said shafts, a regulating lever associated with the other shaft, an adjusting device connecting said levers whereby the angle between the latter may be varied and including locking means for holding the levers in their adjusted relative position, mechanism for automatically releasing said locking means and returning the levers to their original position on movement of the hand lever in a reverse direction, and operative connections from each of said shafts to the respective regulators.

In testimony whereof, I have hereunto set my hand.

FRIEDRICH WEMPE.